(12) United States Patent
Han et al.

(10) Patent No.: US 12,194,394 B2
(45) Date of Patent: Jan. 14, 2025

(54) ELECTRODE INSULATION LIQUID SUPPLY APPARATUS AND ELECTRODE INSULATION LIQUID SUPPLY METHOD

(71) Applicant: LG Energy Solution, Ltd., Seoul (KR)

(72) Inventors: Jin Ki Han, Daejeon (KR); Joon Sun Park, Daejeon (KR); Jae Young Sung, Daejeon (KR); In Chan Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 62 days.

(21) Appl. No.: 17/910,412

(22) PCT Filed: Oct. 7, 2021

(86) PCT No.: PCT/KR2021/013774
§ 371 (c)(1),
(2) Date: Sep. 9, 2022

(87) PCT Pub. No.: WO2022/085999
PCT Pub. Date: Apr. 28, 2022

(65) Prior Publication Data
US 2023/0128280 A1 Apr. 27, 2023

(30) Foreign Application Priority Data

Oct. 23, 2020 (KR) .................. 10-2020-0138326
Oct. 1, 2021 (KR) .................. 10-2021-0131148

(51) Int. Cl.
*B01D 19/02* (2006.01)
*B01D 19/00* (2006.01)
(Continued)

(52) U.S. Cl.
CPC ......... *B01D 19/02* (2013.01); *B01D 19/0036* (2013.01); *B01D 19/0063* (2013.01); *B05C 11/1002* (2013.01); *H01M 10/42* (2013.01)

(58) Field of Classification Search
None
See application file for complete search history.

(56) References Cited

U.S. PATENT DOCUMENTS 5,134,962 A * 8/1992 Amada ................... B05C 11/08
118/712
5,522,660 A * 6/1996 O'Dougherty .......... B01F 25/51
366/136
(Continued)

FOREIGN PATENT DOCUMENTS

CN 209077082 U 7/2019
EP 3059787 A1 8/2016
(Continued)

OTHER PUBLICATIONS

Extended European Search Report for Application No. 21883070.1 dated Aug. 10, 2023. 11 pgs.
(Continued)

*Primary Examiner* — Jethro M. Pence
(74) *Attorney, Agent, or Firm* — Lerner David LLP (57) ABSTRACT

A method and apparatus for supplying insulating liquid to form an insulating coating layer on an electrode is disclosed herein. In some embodiments, an apparatus includes a storage tank for storing an insulating liquid; a coating die for coating the insulating liquid on an electrode; a supply line which supplies the insulating liquid from the storage tank to the coating die; a pump connected to the supply line; a defoaming tank connected to the storage tank and supplies defoamed insulating liquid to the storage tank; a vacuum pump which defoams bubbles of the insulating liquid by applying vacuum to the defoaming tank; a bubble sensor connected to the supply line, wherein the bubble sensor senses generation of bubbles in the supply line in real time; and a controller for adjusting an operating condition of the
(Continued)

apparatus based on an amount of bubbles sensed by the bubble sensor.

11 Claims, 4 Drawing Sheets

(51) Int. Cl.
*B05C 11/10* (2006.01)
*H01M 10/42* (2006.01)

(56) References Cited

U.S. PATENT DOCUMENTS

| | | | | |
|---|---|---|---|---|
| 6,848,625 | B2* | 2/2005 | Takekuma | H01L 21/6715 239/69 |
| 7,566,315 | B2* | 7/2009 | Hirabuki | A61M 1/0218 604/6.15 |
| 8,096,934 | B2* | 1/2012 | Koide | B01D 53/18 405/129.1 |
| 8,117,981 | B2* | 2/2012 | Nishimura | B05D 1/26 118/712 |
| 8,317,165 | B2* | 11/2012 | Yamasaki | B01F 33/811 261/26 |
| 8,349,254 | B2* | 1/2013 | Hoshino | A61M 1/0218 604/4.01 |
| 8,529,487 | B2* | 9/2013 | Fava | A61M 1/1664 604/4.01 |
| 8,684,927 | B2* | 4/2014 | Basaglia | G16H 20/17 600/301 |
| 8,689,615 | B2* | 4/2014 | Saegusa | G01N 35/1016 422/107 |
| 8,905,959 | B2* | 12/2014 | Basaglia | A61M 1/36 604/4.01 |
| 8,938,195 | B2* | 1/2015 | Priebe | G03G 15/2096 399/338 |
| 9,117,012 | B2* | 8/2015 | Basaglia | A61M 1/16 |
| 10,513,052 | B2* | 12/2019 | Suzuki | B29C 39/24 |
| 10,734,251 | B2* | 8/2020 | Takayanagi | H01L 21/67017 |
| 11,289,322 | B2* | 3/2022 | Hirikiri | H01L 21/3081 |
| 11,342,198 | B2* | 5/2022 | Terashita | H01L 21/67017 |
| 11,394,530 | B2* | 7/2022 | Samid | H04L 9/12 |
| 11,697,139 | B2* | 7/2023 | Domeracki | B08B 9/0321 134/22.12 |
| 11,791,151 | B2* | 10/2023 | Hirikiri | H01L 21/02639 438/746 |
| 2004/0173093 | A1 | 9/2004 | Takahashi | |
| 2005/0043900 | A1 | 2/2005 | Franda et al. | |
| 2005/0230314 | A1* | 10/2005 | Kim | A61M 1/3403 210/646 |
| 2009/0183676 | A1 | 7/2009 | Fujii et al. | |
| 2010/0229726 | A1 | 9/2010 | Nishimura et al. | |
| 2011/0107251 | A1* | 5/2011 | Guaitoli | G16H 40/40 715/772 |
| 2012/0070315 | A1* | 3/2012 | Butler | B01J 19/008 417/313 |
| 2012/0291704 | A1 | 11/2012 | Nozaki et al. | |
| 2014/0034584 | A1 | 2/2014 | Marumoto et al. | |
| 2014/0093797 | A1 | 4/2014 | Muetschele | |
| 2020/0136133 | A1 | 4/2020 | Umehara | |
| 2022/0088281 | A1* | 3/2022 | Furuhashi | A61M 1/3646 |
| 2022/0283195 | A1* | 9/2022 | Hirama | G01N 35/1002 |
| 2023/0128280 | A1* | 4/2023 | Han | B01D 19/0036 427/561 |
| 2023/0271859 | A1* | 8/2023 | Ueda | C02F 1/008 210/143 |
| 2023/0302504 | A1* | 9/2023 | Domeracki | F04B 43/0736 |
| 2023/0302812 | A1* | 9/2023 | Kyoso | B41J 2/17513 |
| 2024/0000304 | A1* | 1/2024 | Getsy | A61B 1/125 |
| 2024/0032528 | A1* | 2/2024 | Wszola | C12M 21/08 |
| 2024/0075192 | A1* | 3/2024 | Matsubara | A61M 1/3431 |

FOREIGN PATENT DOCUMENTS

| | | |
|---|---|---|
| JP | H08287966 A | 11/1996 |
| JP | H08293331 A | 11/1996 |
| JP | H1147670 A | 2/1999 |
| JP | 2000051771 A | 2/2000 |
| JP | 3414572 B2 | 6/2003 |
| JP | 2011034754 A | 2/2011 |
| JP | 4919665 B2 | 4/2012 |
| JP | 2014523604 A | 9/2014 |
| JP | 2017010644 A | 1/2017 |
| JP | 2018051495 A | 4/2018 |
| KR | 2004-0102560 A | 12/2004 |
| KR | 20120117474 A | 10/2012 |
| KR | 102035822 B1 | 11/2019 |
| KR | 20200049640 A | 5/2020 |

OTHER PUBLICATIONS

International Search Report for Application No. PCT/KR2021/013774 mailed Jan. 28, 2022, pp. 1-3.

* cited by examiner

ELECTRODE INSULATION LIQUID SUPPLY APPARATUS AND ELECTRODE INSULATION LIQUID SUPPLY METHOD

CROSS-REFERENCE TO RELATED APPLICATIONS

This application is a national phase entry under 35 U.S.C. § 371 of International Application No. PCT/KR2021/013774, filed on Oct. 7, 2021, which claims priority from Korean Patent Application No. 10-2020-0138326, filed on Oct. 23, 2020, and Korean Patent Application No. 10-2021-0131148, filed on Oct. 1, 2021, the content of which are incorporated by reference.

TECHNICAL FIELD

The present invention relates to an apparatus for supplying insulating liquid to an electrode for a battery and a method for supplying the insulating liquid.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

One of the major research tasks in these secondary batteries is to improve safety. Battery safety related accidents are closely related with abnormal high temperature conditions due to a short circuit between a positive electrode and a negative electrode. Namely, in a normal situation, a separator is positioned between a positive electrode and a negative electrode, to thereby maintain electrical insulation, but in an abnormal situation where a battery causes overcharge or overdischarge, an internal short circuit occurs due to dendritic growth of an electrode material, or a foreign material, a sharp object such as nail, screws, etc. penetrates a battery, or a battery is deformed by external force, the existing separator is not sufficient.

Further, the separator, which is mainly formed of a microporous membrane made of a polyolefin resin, has a heat resistance temperature of about 120 to 160° C., which is not a sufficient heat resistance. Hence, when an internal short circuit occurs, the separator shrinks due to the short circuit reaction heat and the short circuit occurs in a larger area, which leads to a thermal runaway state where more reaction heat is generated.

Hence, in order to reduce the possibility of a short circuit of the positive electrode and the negative electrode by maintaining the insulation of the battery electrode, the devising of a method for coating an insulating liquid on the portion of the positive electrode is in progress.

Figure 1:
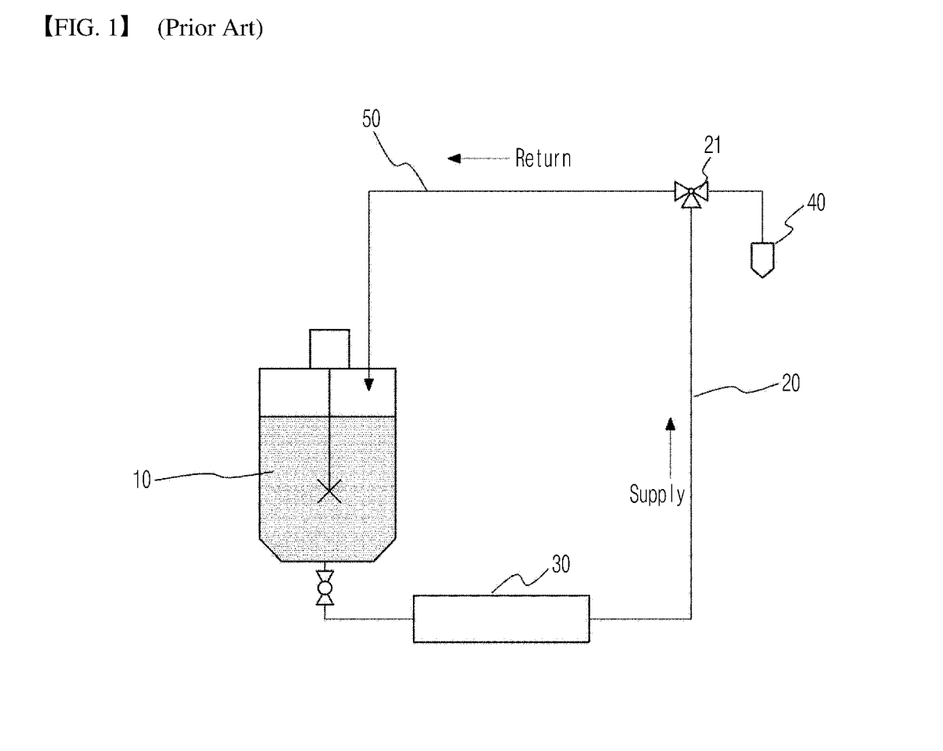
FIG. 1 is a conceptual diagram of a conventional electrode insulating liquid supply device.

FIG. 1 is a conceptual diagram of a conventional electrode insulating liquid supply device. As illustrated, insulating liquid is supplied to the insulating liquid coating die 40 through the supply line 20 from the storage tank 10 where the predetermined insulating liquid is stored. The insulating liquid having a high viscosity is pumped by a pump 30 to thereby be supplied to a coating die 40, and the insulating liquid is discharged by a nozzle from the coating die 40 to then be coated on the surface of the positive electrode. When the coating is completed, the insulating liquid of the supply line is returned to the storage tank 10 through the return line 50 by the direction change valve 21.

However, the bubbles are inevitably mixed in the insulating liquid in the supply line, which is supplied to the conventional electrode insulating liquid supply apparatus. It is estimated that the bubbles are generated by a fall head when insulating liquid is put in the storage tank 10, or is generated by pores in the pump 30 installed in the supply line 20, pores between the supply line 20 and the pump 30, and leakage.

If bubbles are generated in the insulating liquid transferred to the supply line, a pin hole defect, in which pin holes are generated at positions where bubbles have been evaporated at the time of heat-drying after coating an insulating layer on a coating die, is generated. The pin hole defect gives adverse effects to the insulating nature of the electrode, which makes it difficult to reach the designed electrode insulation performance and increases a danger of a short circuit between electrodes.

Therefore, there is a need for a technology of suppressing a pin hole defect by removing bubbles in insulating liquid when supplying the insulating liquid to an electrode.

Further, a technology of defoaming bubbles in an electrode slurry when coating an electrode slurry, which is not insulating liquid, on a current collector has been proposed. However, forms of insulating liquid and the electrode slurry are different because the insulating liquid is liquid and the electrode slurry is a slurry, and their physical properties such as viscosity are also different. Therefore, there is a limit in applying a defoaming device of an electrode slurry at the time of defoaming insulating liquid.

Further, even when considering application of the defoaming technology of the electrode slurry at the time of defoaming insulating liquid, if the level of bubbles in the supply line 20 is not recognized, bubbles may be insufficiently defoamed or excessively defoamed. Namely, even when the insulating liquid in the storage tank 10 can be mechanically defoamed, if the level of bubbles is not carefully monitored, it may be difficult to prevent generation of a pin hole in a coating die 40.

Hence, there is a need for a technology for appropriately recognizing the level of bubbles in a supply line and applying the information to the defoaming process.

PRIOR ART LITERATURE

Patent Document

Korean Patent No. 10-2035822

DISCLOSURE

Technical Problem

The present invention is believed to solve at least some of the above problems. For example, an aspect of the present invention provides an electrode insulating liquid supplying apparatus and method for removing bubbles generated at the time of supplying insulating liquid to an electrode.

Further, another aspect of the present invention provides an electrode insulating liquid supplying apparatus and method for efficiently removing bubbles by measuring bubbles generated in a supply line in real time at the time of supplying insulating liquid to an electrode.

Technical Solution

An apparatus for supplying insulating liquid for forming an insulation coating layer on an electrode for solving the above problems includes: a storage tank for storing an insulating liquid; a coating die for coating the insulating liquid on an electrode; a supply line which connects the storage tank to the coating die and supplies the insulating liquid from the storage tank to the coating die; a pump which is connected to the supply line; a defoaming tank connected to the storage tank and supplies defoamed insulating liquid to the storage tank; a vacuum pump connected to the defoaming tank, where the vacuum pump defoams bubbles of the insulating liquid by applying vacuum to the defoaming tank; a bubble sensor connected to the supply line and senses generation of bubbles in the supply line in real time; and a controller for adjusting an operating condition of the apparatus based on an amount of bubbles sensed by the bubble sensor.

In one example, the controller may allow supply of the insulating liquid to the coating die if the amount of bubbles sensed by the bubble sensor is equal to or less than a predetermined value, and stops supply of the insulating liquid to the coating die if the amount of bubbles sensed by the bubble sensor exceeds the predetermined value.

Alternatively, the controller may adjust a degree of vacuum applied by the vacuum pump or a rate of rotation of stirring blades of a stirring member connected to the defoaming tank according to the amount of bubbles sensed by the bubble sensor.

In one example, the apparatus may further include a return line connected to the supply line which returns the insulating liquid from the supply line to the defoaming tank by a direction change valve.

In one preferred example of the present invention, clean dry air (CDA) of a predetermined pressure may be supplied into the defoaming tank, and the insulating liquid in the defoaming tank may be transferred to the storage tank by a pressure of the clean dry air.

Specifically, the pressure of the clean dry air may be in a range in which the clean dry air is not dissolved in the insulating liquid in consideration of viscosity of the insulating liquid under an operating condition of the defoaming tank. In one example, the pressure of the clean dry air is in a range of 0.3 to 2 MPa. In a specific example, the clean dry air may be nitrogen.

Preferably, the bubble sensor is an ultrasonic sensor. Further, at least one bubble sensor may be connected at a position on the supply line where a frequency of bubble generation is high.

Further, the present invention provides a method for supplying insulating liquid to form an insulation coating layer on an electrode. In one example, the method for supplying insulating liquid of the present invention includes: defoaming bubbles in the insulating liquid by applying vacuum to a defoaming tank containing the insulating liquid; transferring the defoamed insulating liquid from the defoaming tank to a storage tank; depositing the defoamed insulating liquid on an electrode using a coating die to form an insulating liquid coating layer on the electrode, where the defoamed insulating liquid is transferred from by the storage tank to the coating die through a supply line. Particularly, the method may further include adjusting an operating condition of an apparatus for supplying insulating liquid based on an amount of bubbles sensed by a bubble sensor by sensing bubbles in the supply line using the bubble sensor during transfer of the insulating liquid through the supply line.

Advantageous Effects

According to an electrode insulating liquid supplying apparatus and method of the present invention, it is possible to reduce the pin hole defect of an insulation coating layer by suppressing bubbles in the insulating liquid supply line as much as possible.

Further, it is possible to monitor the level of generation of bubbles in the supply line in real time by installing a bubble sensor in the insulating liquid supply line, thereby more efficiently removing bubbles.

DETAILED DESCRIPTION OF THE PREFERRED EMBODIMENTS

Hereinafter, the detailed configuration of the present invention will be described in detail with reference to the accompanying drawings and various embodiments. Embodiments described below are exemplary to assist in understanding of the present invention, and in order to help understand the invention, the accompanying drawings are not shown as actual scale and the dimensions of some components may be exaggerated.

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

The present invention provides an apparatus for supplying insulating liquid for forming an insulation coating layer on an electrode.

An apparatus for supplying insulating liquid of the present invention includes: a storage tank for storing an insulating liquid; a coating die for coating the insulating liquid on an electrode; a supply line which connects the storage tank to the coating die and supplies the insulating liquid from the storage tank to the coating die; a pump which is connected to the supply line; a defoaming tank connected to the storage tank and supplies defoamed insulating liquid to the storage tank; a vacuum pump connected to the defoaming tank, where the vacuum pump defoams bubbles of the insulating liquid by applying vacuum to the defoaming tank; a bubble sensor connected to the supply line and senses generation of bubbles in the supply line in real time; and a controller for adjusting an operating condition of the apparatus based on an amount of bubbles sensed by the bubble sensor.

One of the features of the present invention is in allowing mutual connection by installing a defoaming tank for defoaming bubbles separately from the insulating liquid storage tank in an electrode insulating liquid supplying apparatus. Since a general insulating liquid storage tank structurally has a limit in the airtightness, defoaming bubbles by directly connecting a vacuum pump to the insulating liquid storage tank is not efficient. Further, a discharge line for discharging air at the defoaming, and a connection line with a vacuum pump should be in a tank, and it is difficult to install complicated lines in terms of the structure of the conventional storage tank.

Hence, in the present invention, a separate defoaming tank, which has airtightness and is easy to be installed, is installed and is connected to a storage tank. Further, when a defoaming tank and a storage tank are separately installed, there are two tanks capable of storing insulating liquid, and accordingly, the insulating liquid storage capacity increases, and the flow rate and capacity of the insulating liquid of the defoaming tank and the storage tank can be appropriately controlled. In some cases, if a plurality of defoaming tanks are connected to the storage tank, the capacity of the storage tank can increase.

First Embodiment

Figure 2:
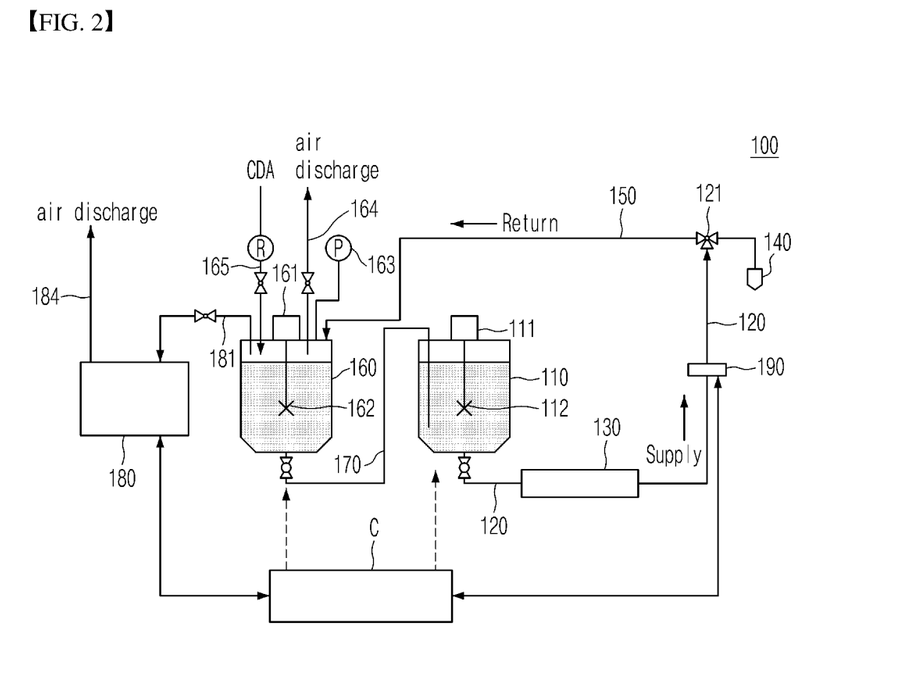
FIG. 2 is a schematic diagram of an electrode insulating liquid supply apparatus according to one embodiment of the present invention.

FIG. 2 is a schematic diagram of an electrode insulating liquid supply apparatus 100 according to a first embodiment of the present invention.

As illustrated, insulating liquid is supplied to the insulating liquid coating die 140 through the supply line 120 from the storage tank 110 where the predetermined insulating liquid is stored. The insulating liquid is composed of about 90% or more of binders and 10% or less of solids, and the viscosity is pretty high (900 to 5,000 cP). When the viscosity is low, the fluidity increases. Hence, it is preferable to lower the viscosity of the insulating liquid as much as possible. The viscosity of the insulating liquid is preferably in the range of 900 to 3000 cP. The insulating liquid charged in the storage tank 110 is preferably insulating liquid which has been defoamed in advance from the defoaming tank 160, as will be described later. The stirring blade 112 for stirring insulating liquid is rotated by the motor 111 in the storage tank 110.

The predetermined insulating liquid, which may be used in the present invention, may be a solution containing a polymer made of one or more selected from the group consisting of polybutadiene, polyurethane, polyimide, acetate, polyester, polyphenylene sulfide, polypropylene, styrene-butadiene-based copolymer, (meta)acrylic acid, (meta)acrylate copolymer, polyacrylonitrile, polyvinyl chloride, polyfluoro compound, polyvinyl alcohol, and polycyanoacrylate; or a monomer used for polymerization of polymer of one or more selected from the group consisting of polybutadiene, polyurethane, polyimide, acetate, polyester, polyphenylene sulfide, polypropylene, styrene-butadiene-based copolymer, (meta)acrylic acid, (meta)acrylate copolymer, polyacrylonitrile, polyvinyl chloride, polyfluoro compound, polyvinyl alcohol, and polycyanoacrylate.

Specifically, polyvinylidene fluoride (PVdF)-based insulating liquid, ceramic-based insulating liquid (e.g., aluminum hydroxide-based insulating liquid such as boehmite) may be used.

The insulating liquid may contain one or more solvents selected from the group consisting of water, glycerol, ethylene glycol, propylene glycol, dimethyl sulfoxide, dimethylformamide, acetonitrile, ethylene carbonate, furfuryl alcohol, and methanol.

The high viscosity insulating liquid of the storage tank 110 is pumped by the pump 130 to be supplied to the coating die 140, and the insulating liquid is discharged by a predetermined nozzle from the coating die 140 to thereby be coated on the surface of the electrode (e.g., a positive electrode). The pump 130 may be, for example, a mono pump of a simple structure. A mono pump is composed of a stator formed of an elastic body having a spiral tunnel in a pump, and a spiral rotor which is rotated in the stator. Herein, if the rotor is rotated in the stator, liquid is consecutively flown from an inlet to a discharge port in an axial direction in the pump. In the present specification, a mono pump was mentioned, but any pump capable of appropriately transferring liquid in a supply line in consideration of the viscosity and physical properties of the insulating liquid may be used.

In the present embodiment, the defoaming tank 160 is connected to the insulating liquid storage tank 110 by a pipe 170. The insulating liquid storage capacity of the defoaming tank 160 may be the same as or different from that of the insulating liquid storage tank 110, but it is preferable that they are the same in terms of the capacity management. In the defoaming tank 160, the insulating liquid may be stirred by rotation of the stirring blade 162 by a motor 161 as in the storage tank 110. The number of rotations of the stirring blade 162 may be selected within an appropriate range in order to raise bubbles in the insulating liquid in addition to the insulating liquid stirring. Reference numeral 163 refers to a pressure gauge, and reference numeral 164 refers to a discharge line through which bubble-mixed air may be discharged. The insulating liquid in the defoaming tank 160 is supplied to the storage tank 110 through a pipe 170 after bubbles are defoamed by the vacuum pump 180 as will be described later.

The defoaming tank 160 is connected to the vacuum pump 180 by a connection line 181 and may discharge air in the defoaming tank 160 through a discharge line 164 by the power of vacuum.

The vacuum degree of the vacuum pump 180 may be appropriately adjusted according to the capacity of the defoaming tank 160 and the storage tank 110 and the air flow rate and the amount of bubbles generated in each tank.

The air, which is inevitably injected into the vacuum pump 180 by vacuum suction of the vacuum pump 180 (where bubbles may also be mixed), is discharged to the outside through a discharge line 184 equipped in the vacuum pump 180.

FIG. 2 shows an example where a direction change valve 121 is installed in a supply line 120 adjacent to the coating die 140, and an insulating liquid return line 150 is installed from the direction change valve 121 to a defoaming tank 160. This is an insulating liquid circulation circuit (closed circuit) formed of defoaming tank 160—insulating liquid storage tank 110—supply line 120—(coating die 140)—direction change valve 121—return line 150.

The direction change valve 121, for example, may be a 3-way valve, and adjusts the insulating liquid supply from the supply line 120 to the coating die 140, and the insulating liquid flow from the supply line 120 to the return line 150 (when the coating is terminated or is stopped).

The insulating liquid pipe such as the supply line 120 and the return line 150 is preferably formed of a pipe made of a material having small frictional force with the insulating liquid. Particularly, since the insulating liquid has a large viscosity, it may be difficult to obtain a desired transfer speed when transferred to the coater according to the frictional force with the pipe. Further, the diameter of the pipe is preferably a value which is appropriate for the transfer of a high viscosity insulating liquid. Hence, the material, the diameter, etc. of the pipe may be appropriately decided in consideration of the viscosity and transfer speed of the insulating liquid. For example, if the viscosity of the insulating liquid is in the range of 900 to 5000 cP, the insulating liquid may be supplied to the coater at the transfer speed of 0.060 to 0.30 L/min. In this case, for example, a pipe of 1 inch or higher may be used. Further, a pipe made of stainless steel or Teflon, which has a low frictional force with high viscosity insulating liquid, may be used as the pipe.

Further, it is preferable to set the pump pressure of the mono pump to an appropriate value in order to achieve the targeted transfer speed of the high viscosity insulating liquid.

The advantage of the circulation circuit is in being able to defoaming the remaining insulating liquid and reusing it in the insulation coating. Herein, if a predetermined valve, and a branch line (not shown) connected to a drain line are installed at an insulating liquid return line 150 before reaching the defoaming tank 160, the drain of the insulating liquid and the return flow to the defoaming tank 160 may be selectively or simultaneously achieved as necessary.

Since such a valve configuration is equipped in a general insulating liquid supply device, too, the detailed description of the function and action will be omitted here.

Referring to FIG. 2, other valves capable of adjusting the flow rate are installed at the connection line, the pipe, etc. of each element. Herein, the points about such valves correspond to a general technical matter in the pipe line, and accordingly, the detailed description thereof will be omitted here.

The main feature of the present invention is in organically connecting bubble measurement with bubble defoamation by installing a bubble sensor 190 capable of sensing the generation status of bubbles in real time in the insulating liquid supply line 120.

It is possible to efficiently reuse insulating liquid and maintain the level of bubbles of the insulating liquid in the supply line 120 constant by operating a defoaming system, which is composed of a vacuum pump 180 and a defoaming tank 160, by a controller C to transfer defoamed insulating liquid to the storage tank 110, or defoam insulating liquid, which returns to the defoaming tank 160, and transfer the defoamed insulating liquid to the storage tank 110. However, if the level of the bubbles in the supply line 120 is not recognized, the bubbles may not be sufficiently defoamed or may be excessively defoamed.

Hence, in the present invention, the generation status of bubbles is monitored in real time by installing a bubble sensor 190 in the supply line 120. In the present invention, as a specific example of the bubble sensor 190, the amount of bubbles in the supply line was efficiently measured by applying an ultrasonic sensor, as will be described later.

Specifically, in the initial period of the operation of the insulating liquid supply apparatus 100, insulating liquid, which has been defoamed in the defoaming tank 160 in advance, is transferred to the storage tank 110, and accordingly, a pin hole defect can be prevented in the coating die 140. However, bubbles may be generated by a fall head in the storage tank 110 during the repeated and consecutive process of coating insulating liquid thereafter, and bubbles may be generated in the supply line 120 by the continuous inflow of air containing impurities from the outside during the pumping process in the pump 120. The bubble sensor 190 may sense the amount of bubbles in real time and send the data to the controller C of the insulating liquid supply apparatus 100. The controller C may adjust the operating condition of the insulating liquid supply apparatus 100 based on the data about the amount of bubbles. In the present specification, "operating condition" of the insulating liquid supply apparatus includes a decision about whether to continue to supply insulating liquid to a supply line (namely, a decision about opening/closing condition of each valve), a temperature or pressure setting condition in the defoaming tank, an operating condition such as the number of rotations of the stirring blade, and a condition value related to operation of each component such as a vacuum degree of the vacuum pump, and is a concept including the overall apparatus operating condition for adjusting the defoaming performance or whether to continue insulating liquid according to the conditions. Likewise, according to the present invention, it is possible to effectively suppress pin hole generation of the insulating liquid coating layer by organically adjusting the operation of the insulating liquid supply apparatus 100 based on the value of the amount of bubbles measured by the bubble sensor.

Specifically, it is possible to set data about the amount of bubbles of a predetermined range, where a pin hole defect occurs, in advance, and adjust the operating condition of the apparatus by comparing the data with the amount of bubbles measured by the bubble sensor. If the amount of bubbles sensed by the bubble sensor is equal to or less than a predetermined value, the supplying of the insulating liquid to the coating die is continued, but if the amount of bubbles sensed by the bubble sensor exceeds the predetermined value, the controller C may block the direction change valve 121 and stop the supply of the insulating liquid. In this case, the insulating liquid, which contains bubbles exceeding a predetermined value, returns to the defoaming tank 160 through the return line 150 and goes through the defoaming process. In the insulating liquid, which has been supplied to the supply line 120 again via the storage tank 110 after the defoamation, the amount of bubbles is measured again through the bubble sensor 190, and this process may be repeated until the amount of bubbles decreases to a value equal to or less than the predetermined value. Namely, according to the present invention, it is possible to suppress the pin hole defect by transferring insulating liquid having bubbles equal to or less than a predetermined amount to the coating die.

Further, even if the amount of bubbles sensed by the bubble sensor 190 exceeds a predetermined value or if the amount of bubbles tends to increase even when within a predetermined value, it is possible to reinforce the defoaming performance by improving the vacuum degree of the vacuum pump 180, which is one of operating conditions of the apparatus. Alternatively, it is possible to strengthen the air discharge in the defoaming tank 160 by increasing the number of rotations of the stirring member 162 installed at the defoaming tank 160.

In summary, according to the present invention, it is possible to control the defoaming degree of the insulating liquid in real time by monitoring the amount of bubbles in the supply line in real time and adjusting the operating conditions of the insulating liquid supply apparatus 100 based on the monitored data in response to operating situations of an apparatus and various variables.

Second Embodiment

Referring to FIG. 2, a second embodiment of the present invention will also be described.

In the present embodiment, clean dry air (CDA) is supplied through the supply line 165 of the CDA in order to transfer the insulating liquid in the defoaming tank 160 to the storage tank 110. Herein, it is possible to transfer insulating liquid defoamed in the defoaming tank 160 to the storage tank 110 by installing a separate pump in a pipe 170, which connects the defoaming tank 160 to the storage tank 110, as in a pump 130 installed at the supply line 120 of the insulating liquid supply apparatus 100. However, when considering that it is estimated that one of main reasons of bubble generation is pores and leakage, transfer by a pump has a danger that bubbles may be mixed. Hence, in the present embodiment, insulating liquid is transferred by applying pressure with CDA instead of a pump. The clean dry air system is a system which supplies optimal compressed air by filtering contaminants such as dust, oil, and moisture to be within a predetermined level based on the requirements.

In the present invention, it is possible to efficiently transfer insulating liquid defoamed in the defoaming tank 160 to the storage tank 110 by using compressed air (CDA) of the clean dry air system. Strictly speaking, the insulating liquid in the defoaming tank 160 is transferred to the storage tank 110 by the resultant force of the pressure of the CDA and the potential energy by a fall head within the defoaming tank 160.

In FIG. 2, R denotes a regulator which allows CDA to be transferred with a constant pressure.

Since the insulating liquid has a high viscosity as described above, if the pressure of the CDA is appropriately set, it is possible to prevent generation of bubbles as the CDA is dissolved in the insulating liquid. Namely, it is important to set the pressure of the clean dry air (CDA) to be in a range in which it is not dissolved in consideration of viscosity of the insulating liquid in the operating condition of the defoaming tank (e.g., temperature and pressure in the defoaming tank). When considering the insulating liquid having a viscosity in a range of 900 to 5000 cP under the operating condition of the used defoaming tank, if the pressure of the CDA is set to 2 MPa, the CDA is rarely dissolved in the insulating liquid. In order to transfer insulating liquid, a pressure of at least 0.3 MPa is necessary. The pressure is preferably equal to or less than 1 MPa, and more preferably in the range of 0.5 to 0.7 MPa.

Alternatively, if nitrogen is used as CDA, it is possible to more effectively block dissolution in the insulating liquid. $N_2$ is appropriate as CDA media of the pressure because it has a low chemical activity and a low solubility to water at a low pressure. Likewise, in the present invention, transferring insulating liquid with CDA has an advantage that the insulating liquid can be appropriately transferred while preventing the danger of generation of bubbles by a pump.

Third Embodiment

Figure 3:
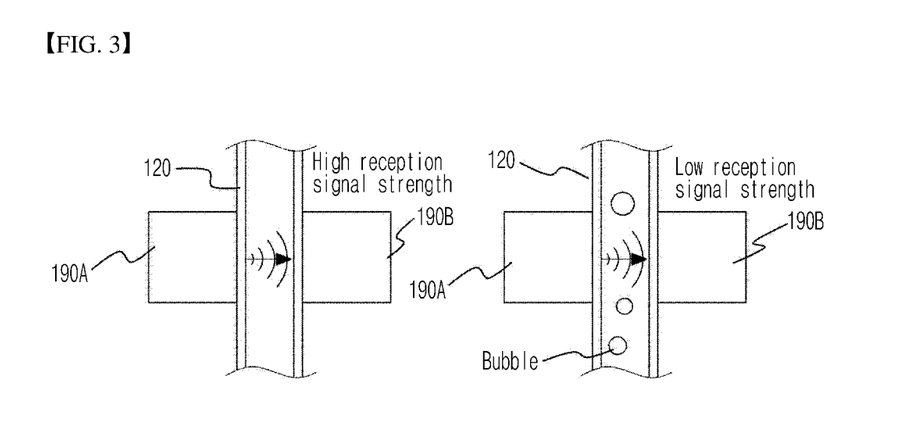
FIG. 3 is a schematic diagram of an ultrasonic sensor used in an electrode insulating liquid supply apparatus of the present invention.

FIG. 3 is a schematic diagram of an ultrasonic sensor 190 used in an electrode insulating liquid supply apparatus 100 of the present invention. Namely, in the present embodiment, an ultrasonic sensor is used as the bubble sensor 190.

As illustrated in FIG. 3, the ultrasonic sensor 190 of the present example is composed of a transmitting sensor 190A (piezoelectric sensor) installed at one side of the tube of the supply line 120, and a receiving sensor 190B (piezoelectric sensor) installed at the other side of the tube, and has a structure in which the bubble generation status is sensed by the strength of the ultrasonic waves transmitted from the transmitting sensor 190A. Namely, if ultrasonic waves are generated by applying a voltage to the transmitting sensor 190A, the ultrasonic waves pass through the tube and are sensed by the receiving sensor 190B. When there is no or only a few bubbles (see the left figure of FIG. 3), the strength of the ultrasonic waves sensed by the receiving sensor 190B increases, which is detected as a greater voltage in the receiving sensor 190B. If the number of bubbles is large (see the right figure of FIG. 3), the strength of the ultrasonic waves decreases, which is detected as a smaller voltage in the receiving sensor 190B.

Likewise, in the apparatus of the third embodiment, it is possible to sense and monitor the number or amount of bubbles generated in the insulating liquid in the supply line 120 by an ultrasonic sensor composed of 2 sensors 190A and 190B in real time.

In the above example, an ultrasonic sensor was composed of 2 sensors, but the number of transmitting and receiving sensors is not particularly limited, and two or more sensors may be applied as long as each of the sensors can efficiently measure the bubbles in the tube of the supply line 120. The ultrasonic sensor can efficiently measure the number of bubbles in a non-contact manner by using an ultrasonic sensor. Hence, the ultrasonic sensor is more preferable than other kinds of sensors in terms of contamination prevention of the insulating liquid.

Fourth Embodiment

Figure 4:
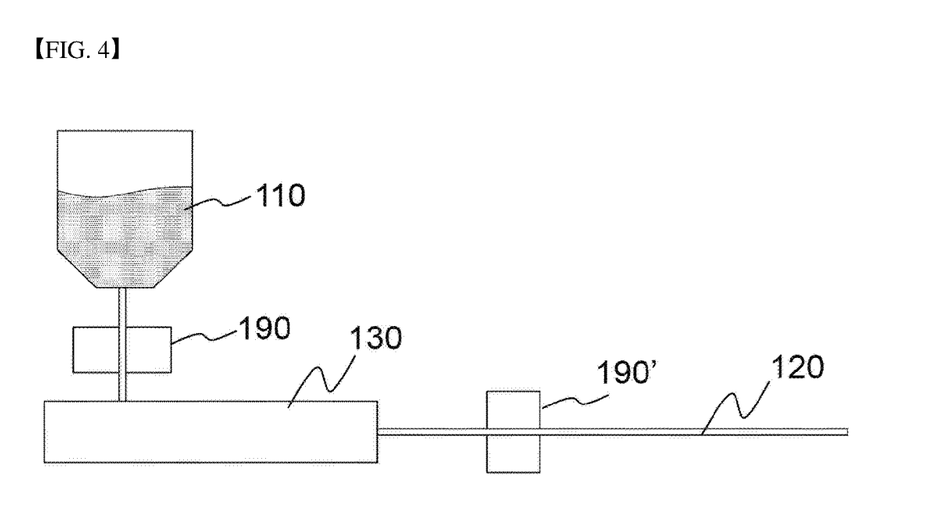
FIG. 4 is a schematic diagram of an electrode insulating liquid supply apparatus according to another embodiment of the present invention.

FIG. 4 is a schematic diagram of an electrode insulating liquid supply apparatus 100 according to another embodiment of the present invention.

In the present embodiment, a plurality of ultrasonic sensors are installed at the position where frequency of bubble generation of the supply line is high.

Namely, since it is estimated that bubbles are generated by a fall head at the time of pouring insulating liquid in the storage tank 110 or are generated by pores and leakage at the time of passing through a pump, ultrasonic sensors 190 and 190' were installed in the supply line 120 between the lower portion of the storage tank 110 and the pump 130, and the supply line 120 after the pump 130, respectively, according to the number of places where bubbles were generated.

As such, it is possible to prevent pin hole defect generation by efficiently recognizing the bubble generation situation and mechanism in the supply line and making a database based thereon by clarifying the number of places of generation of bubbles in the insulating liquid and monitoring the bubble generation situation in each position.

EXAMPLES

The defoaming situation of the electrode insulating liquid supplying apparatus of the present invention was compared with the conventional electrode insulating liquid supplying apparatus in consideration of the mass production situation of the electrode based on each of the above embodiments.

200 L of PVdF insulating liquid, which was obtained by dissolving 7% PVdF solids in an NMP solvent, was poured in the storage tank in the same manner as in the mass production, and 200 L of PVdF insulating liquid was also poured in the defoaming tank, and a defoaming process was then performed for 12 hours at the vacuum degree of the vacuum pump of 0.35 MPa. The viscosity of the PVdF insulating liquid is in the range of 2,000 to 3,000 cP. In the present embodiment, the amount of insulating liquid was set to 200 L, but the amount of insulating liquid may be selected in the range of 100 to 200 L, depending on the production condition. In some cases, it is possible to select a more amount of insulating liquid.

In a comparative example, 200 L of PVdF insulating liquid, which was the same as that in the example, was poured in the storage tank of the conventional electrode insulating liquid supplying apparatus where a defoaming tank has not been installed, which was left for 12 hours, and the status of bubble generation was checked.

As a result of measuring the number of bubbles in a specific portion of the supply line after performing a pumping process by the ultrasonic sensor after 12 hours, 150 bubbles were generated in the case of the comparative example, but the number of bubbles decreased by 96% in the case of the example of the present invention.

As described above, the present invention relates to an insulating liquid supply apparatus capable of monitoring generation of bubbles in real time and efficiently defoaming bubbles according to the bubble generation status.

Further, the present invention may be understood as a method for supplying insulating liquid to form an insulation coating layer on an electrode.

A method of supplying insulating liquid of the present invention includes: defoaming bubbles in the insulating liquid by applying vacuum to a defoaming tank containing the insulating liquid; transferring the defoamed insulating liquid from the defoaming tank to a storage tank; depositing the defoamed insulating liquid on an electrode using a coating die to form an insulating liquid coating layer on the electrode, where the defoamed insulating liquid is transferred from by the storage tank to the coating die through a supply line. Particularly, the method may further include adjusting an operating condition of an apparatus for supplying insulating liquid based on an amount of bubbles sensed by a bubble sensor by sensing bubbles in the supply line using the bubble sensor during transfer of the insulating liquid through the supply line.

According to the insulating liquid supplying method of the present invention, it is possible to more effectively improve the quality of an insulating liquid coating layer by suppressing generation of bubbles while monitoring the bubble generation status in real time.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS

100: insulating liquid supply apparatus
10, 110: (insulating liquid) storage tank
20, 120: supply line
21, 121: direction change valve
30, 130: pump
40, 140: coating die
50, 150: insulating liquid return line
160: defoaming tank
161: stirring motor
162: stirring blade
163: pressure gauge
164: discharge line
165: CDA supply line
170: pipe
180: vacuum pump
181: connection line
184: discharge line
190, 190': bubble sensor (ultrasonic sensor)
190A: transmitting sensor
190B: receiving sensor
C: controller

The invention claimed is:

1. An apparatus for supplying insulating liquid for forming an insulation coating layer on an electrode, the apparatus comprising:
    a storage tank for storing an insulating liquid;
    a coating die for coating the insulating liquid on an electrode;
    a supply line which connects the storage tank to the coating die and supplies the insulating liquid from the storage tank to the coating die;
    a pump connected to the supply line;
    a defoaming tank connected to the storage tank and supplies defoamed insulating liquid to the storage tank;
    a vacuum pump connected to the defoaming tank, wherein the vacuum pump defoams bubbles of the insulating liquid by applying vacuum to the defoaming tank;
    a bubble sensor connected to the supply line, wherein the bubble sensor senses generation of bubbles in the supply line in real time;
    a stirring member connected to the defoaming tank, wherein the stirring member rotates within the defoaming tank; and
    a controller for adjusting an operating condition of the apparatus based on an amount of bubbles sensed by the bubble sensor;
    wherein the controller allows supply of the insulating liquid to the coating die if the amount of bubbles sensed by the bubble sensor is equal to or less than a predetermined value, and stops supply of the insulating liquid to the coating die if the amount of bubbles sensed by the bubble sensor exceeds the predetermined value, or
    wherein the controller adjusts a degree of vacuum applied by the vacuum pump to the defoaming tank based on an amount of bubbles sensed by the bubble sensor, or
    wherein the controller adjusts a rate of rotation of stirring blades of the stirring member based on an amount of bubbles sensed by the bubble sensor.

2. The apparatus of claim 1, further comprising a return line connecting the supply line to the defoaming tank, wherein the return line returns the insulating liquid from the supply line to the defoaming tank by a direction change valve.

3. The apparatus of claim 1, further comprising a regulator configured to allow clean dry air (CDA) of a predetermined pressure into the defoaming tank, and wherein the insulating liquid in the defoaming tank is configured to be transferred to the storage tank by a pressure of the clean dry air.

4. The apparatus of claim 3, wherein the pressure of the clean dry air is in a range in which the clean dry air is not dissolved in the insulating liquid in consideration of viscosity of the insulating liquid under an operating condition of the defoaming tank.

5. The apparatus of claim 4, wherein the pressure of the CDA is in a range of 0.3 to 2 MPa.

6. The apparatus of claim 3, wherein the CDA is nitrogen.

7. The apparatus of claim 1, wherein the bubble sensor is an ultrasonic sensor.

8. The apparatus of claim 1, wherein at least one bubble sensor is connected to the supply line between a lower portion of the storage tank and the pump.

9. The apparatus of claim 7, wherein the bubble sensor is installed in at least one position among a position on the supply line between the storage tank and the pump and a position on the supply line between the pump and a direction change valve.

10. The apparatus of claim 1, wherein a viscosity of the insulating liquid is in a range of 900 to 5000 cP.

11. The apparatus of claim 1, wherein at least one bubble sensor is connected to the supply line after the pump.

\* \* \* \* \*